Patented Apr. 22, 1924.

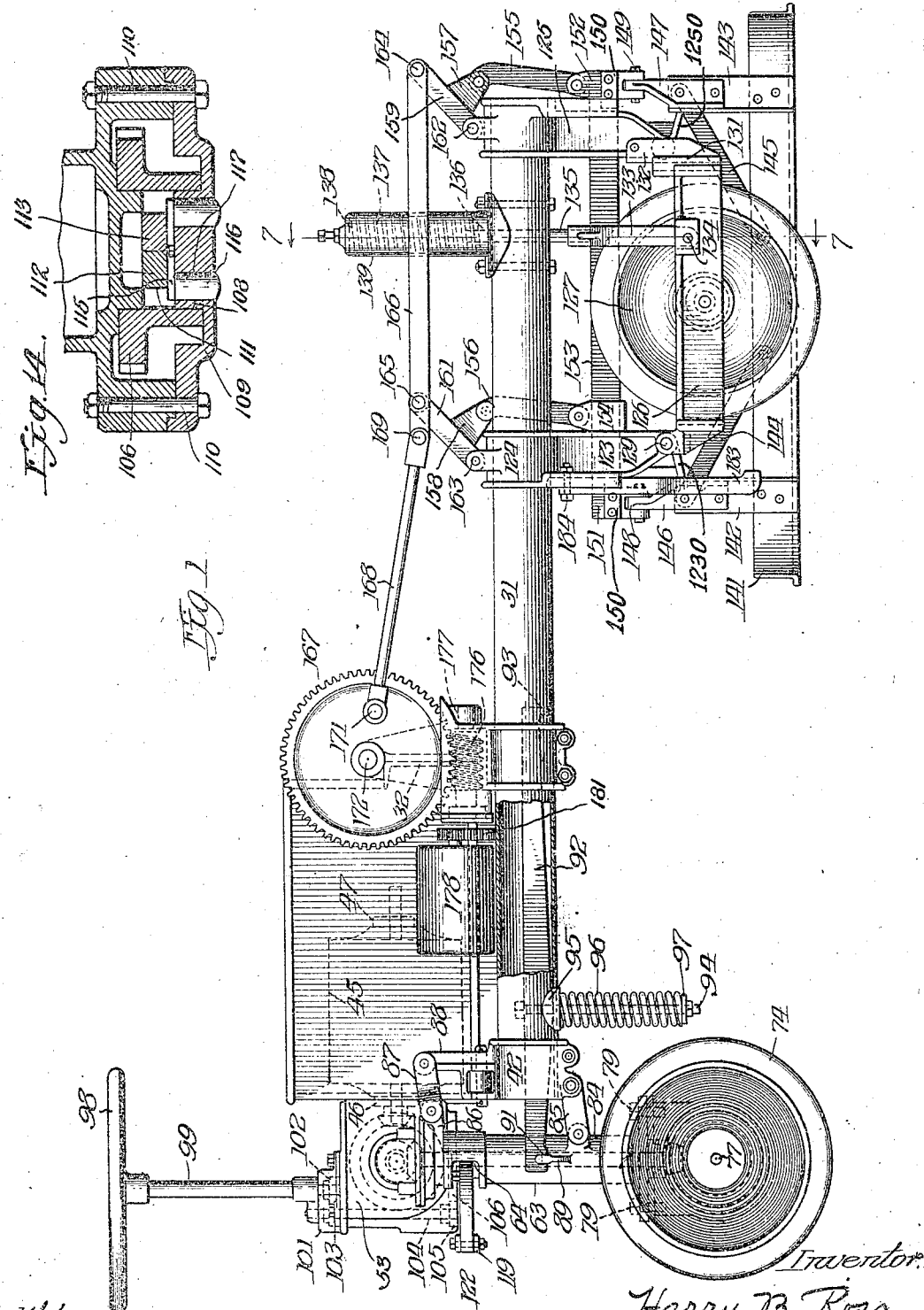

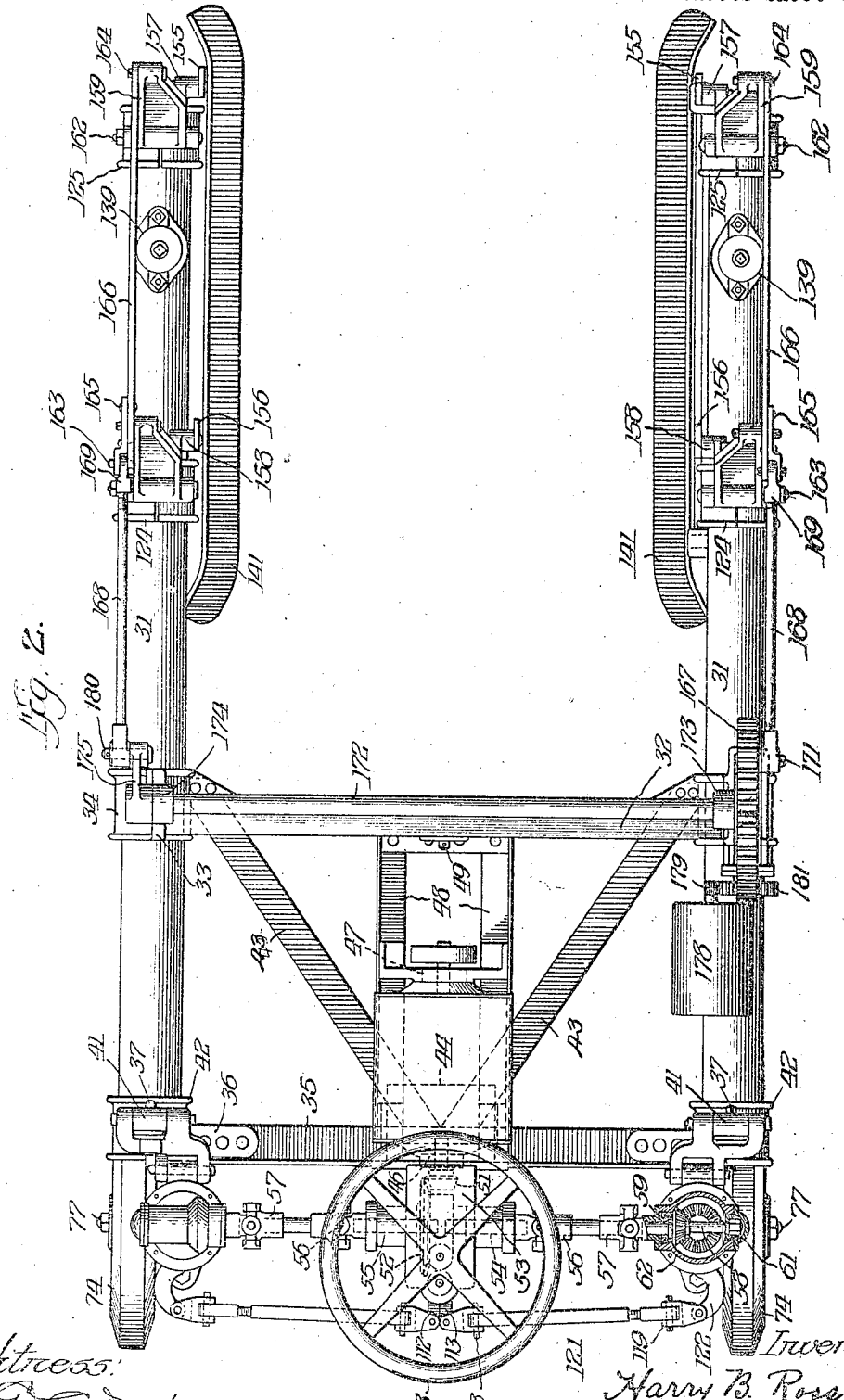

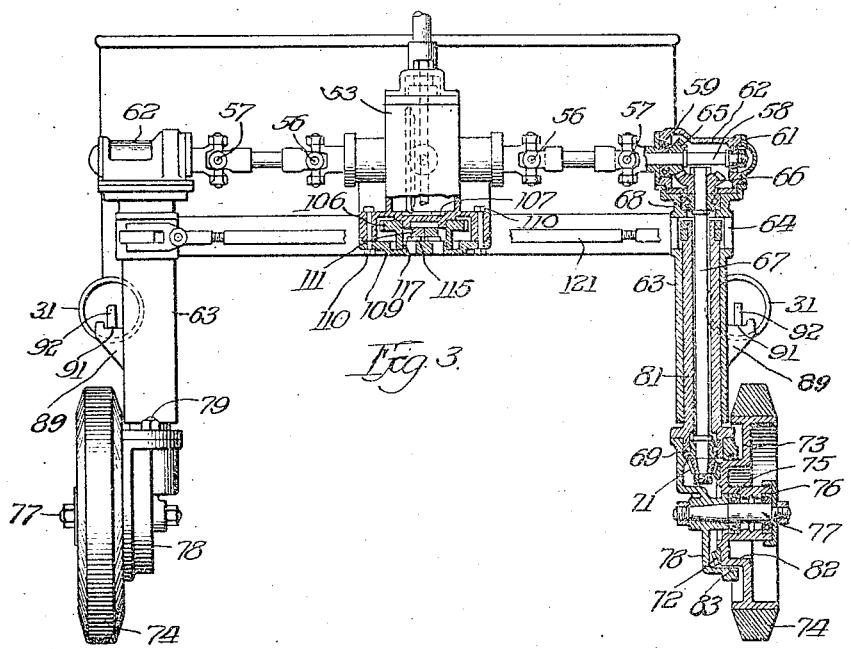
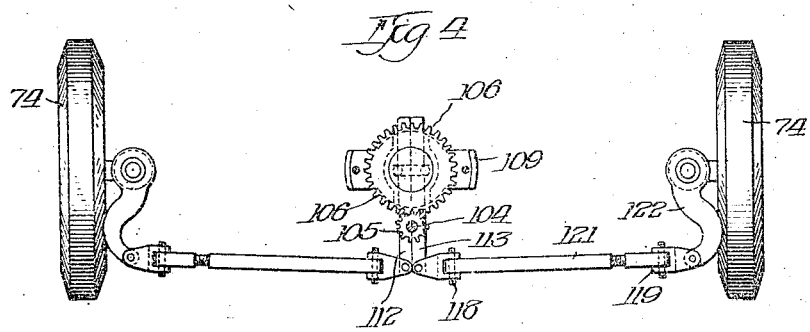
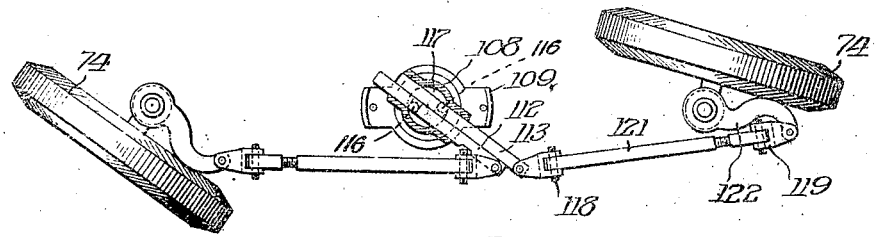

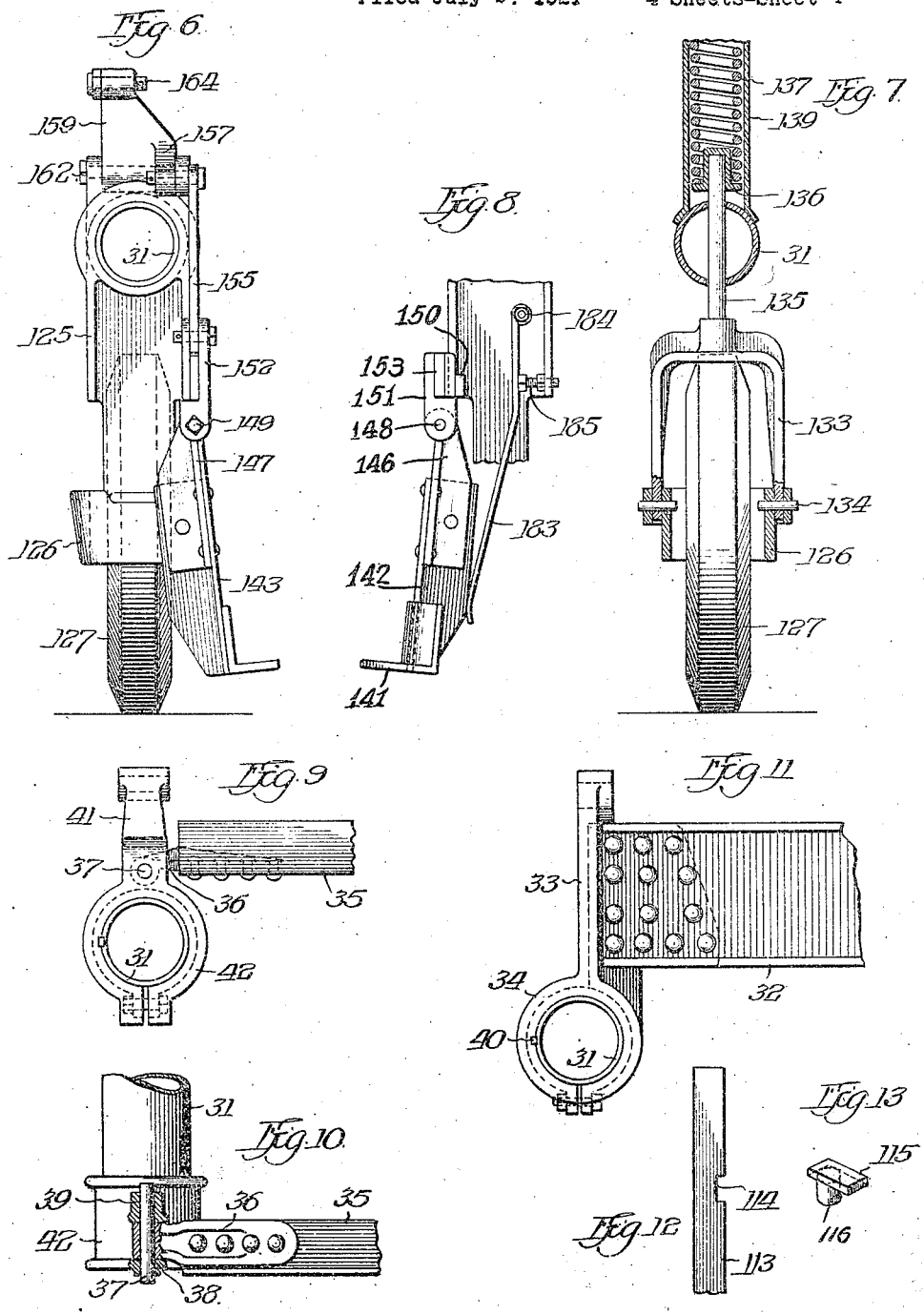

1,491,549

UNITED STATES PATENT OFFICE.

HARRY B. ROSS, OF BENTON HARBOR, MICHIGAN, ASSIGNOR TO THE ROSS CARRIER COMPANY, OF BENTON HARBOR, MICHIGAN, A CORPORATION OF MICHIGAN.

LIFT TRUCK.

Application filed July 2, 1921. Serial No. 482,150.

*To all whom it may concern:*

Be it known that I, HARRY B. Ross, a citizen of the United States, residing at Benton Harbor, in the county of Berrien and State of Michigan, have invented certain new and useful Improvements in Lift Trucks, of which the following is a specification.

The present invention concerns various features of novelty and advantage in motor lift trucks designed and adapted for the handling and transportation of sundry kinds of loads, and one of its prime purposes is the provision of an appliance of this type which permits the carrying or conveying of relatively long material such as metal bars or lumber previously assembled on suitable supports or platforms, or other material of less length but possibly of greater height, such as pieces of machinery, boxes, packages, etc., piled on platforms or trays.

More particularly one object of the invention is the production of such a power-driven truck with an appropriate frame construction to enable it to handle the two classes of loads specified, and which will permit the vehicle to be driven over or astride the load even though the latter may extend beyond the length of or be higher than the truck.

To attain this aim in practicable form, the axles as ordinarily used on vehicles are dispensed with and all cross members are located above the clearance space required for the load, the longitudinal side members of the frame extending back of such transverse elements to a considerable distance, the rear or pay load carrying wheels being located approximately at the end of the rearwardly extended frame, thus providing an open loading space back of the essential operating mechanism extending unobstructedly upwardly from the floor or ground and hence adapted to accommodate a load of any height with the supporting or load carrying wheels on opposite sides of such open space.

A further or additional aim of the invention is the production of an appliance of this style incorporating means for lifting the load and carrying it suspended during its transportation.

Another purpose of the invention is the supplying of a truck of this kind which is simple in structure, being composed of comparatively few parts, which is economical to manufacture, which is effective and efficient in service, and which is unlikely to become impaired or injured in performing its work.

To enable those skilled in this art to have a full and complete understanding of the invention both from structural and functional standpoints, I have illustrated a preferred and desirable embodiment of the same in the accompanying drawings, throughout the several views of which like reference characters refer to the same parts.

In the drawings:

Figure 1 is a side elevation of the improved lift truck with one of the tubular frame members partially broken away;

Figure 2 is a plan view of the truck with a small portion of the elements in section;

Figure 3 is a partial front elevation and partial vertical section;

Figure 4 is a plan view of the steering mechanism;

Figure 5 shows the steering wheels swung to guide the truck in a sharp turn;

Figure 6 is a partial rear elevation of the appliance, that is to say of one of the two longitudinal spaced structures;

Figure 7 is a fragmentary vertical section on an enlarged scale on line 7—7 of Figure 1;

Figure 8 is a fragmentary elevation of one of the load grappling appliances as viewed from the front;

Figures 9, 10, and 11 are details of the frame construction;

Figures 12 and 13 illustrate portions of the steering gear; and

Figure 14 is a detail section of a part of the steering mechanism.

Referring to these drawings, it will be perceived that the machine frame comprises two, main, parallel, spaced, horizontal, side tubular members 31, 31 of substantial length connected together crosswise the truck at about one-third of their length from their front ends by a channel beam 32 fastened at its opposite ends above the side members 31, 31 to suitably-shaped castings 33, 33 having lower split portions 34, 34 surrounding and fixedly clamped to the respective tubular elements, these parts 31 and 34 being also keyed or splined together at 40 to prevent relative rotation.

The front ends of such pair of cylindrical, hollow, open-ended, side frame members 31, 31 are pivotally connected together crosswise by an angle-bar 35 located slightly above such side elements, each end of such anglebar having a hinge-member 36 riveted to its horizontally-disposed flange, such element by means of a hinge pin 37 having a pivotal or hinge connection with spaced, upstanding walls 38, 39, between which its end is accommodated, projecting upwardly from and formed integrally with a casting 41 having a split or divided part 42 receiving and immovably clamped on the end portion of each of the cylindrical frame side elements 31, the parts 31 and 42 being also keyed or splined together.

Oblique braces 43, 43, fastened at their rear ends to portions of the two frame castings 33, 33 and at their front ends to a gusset-plate 44 riveted to the middle part of the front angle-bar 35, act to further stiffen the frame against distortion.

The skeleton frame thus constructed is designed with special reference for strength to withstand the several and diverse strains and loads to which it is subject by reason of its unusual construction and the nature of the work which it performs.

Such frame gives the greatest possible strength for the amount of metal employed to withstand transverse loads, any tendency to spreading action due to the peculiar open rear end structure, and any side thrust imposed on the rear wheels by reason of their location below the axial center of the tubular frame.

The electric-motor 45 which drives the truck has trunnions at its opposite ends rockingly mounted or journalled in front and rear bearing brackets 46, 47, respectively, carried on an angle-iron frame 48 rigidly secured in any approved manner at its front end to the cross angle-bar 35, the rear end of such frame having a swivel bearing 49 on the cross channel 32 whereby to provide a three point support for the motor frame, thus avoiding any warping or twisting therein when the truck frame yields or springs in passing over uneven road surfaces.

The truck is both driven and steered from the front wheels and the following structure has been provided for the reliable and efficient accomplishment of such functions, but this mechanism in its details forms the subject matter of a co-pending application Serial No. 505,747, filed October 6, 1921.

A bevel pinion 51 on the front end of the motor shaft meshes with a bevel gear 52 in a suitably-supported differential-housing 53 containing a differential mechanism of any usual or suitable character associated with the two shafts 54 and 55.

Each of such shafts is operatively connected through two universal joints 56 and 57 to an outer short shaft 58 revoluble in aligned ball bearings 59 and 61 in a capcasing 62 on the top of an upright housing 63 open on one side at 64 through a substantial angle or arc.

Each such shaft 58 is equipped with a vertical bevel-pinion 65 meshing with the teeth of a horizontal gear 66 fast on the upper end of an upright shaft 67 oscillatory in ball-bearings 68 and 69 in the top of such housing and in a lower gear housing described below.

At its bottom end each shaft 67 is fitted with a bevel drive pinion 71 in mesh with the teeth of a bevel-gear 72 on one of the front driving steering wheels 73 equipped with a rubber tire 74 and revoluble on ball-bearings 75 and 76 on a short, outstanding, horizontal axle 77 fixedly mounted in a gear-housing 78 fastened by screws 79 on the lower end of a vertical sleeve 81 surrounding shaft 67 and oscillatory in the housing 63 which forms a bearing therefor.

The body of such load-carrying driving and steering wheel is in cross-section of the form shown in Figure 3 and has a cylindrical portion 82 extending into the casing or housing 78, a suitable dust-guard 83 being employed to exclude foreign matter.

Housing 63 has a lug 84 connected by a link 85 to the lower portion of casting 42 and another lug 86 near its top is similarly connected by a link 87 of equal length to an upward extension 88 on the same casting.

In addition, the housing 63 has an outstanding lug or projection 89 on its outer side, the upper portion of which fits in a notch 91 on the underside of the front projecting end part of a lever 92 accommodated in large measure in the corresponding tubular frame member 31 and having a downturned end 93 resting on the bottom of the interior thereof some distance from its front end.

Intermediate its ends such lever is supplied with a downwardly extended rod 94 projecting down through an aperture in the bottom of the tubular frame member and through an apertured spring seat 95 fastened to the bottom of such member and coacting with a coil spring 96, the rod or bolt having a washer or seat member 97 cooperating with the lower end of the spring.

Obviously the load on the frame is imposed on or transmitted to the combined drive and steering wheel through such spring and lever, thus giving an efficient and satisfactory cushion mounting with a simple structure.

At the center of its front, the truck has a steering-wheel 98 on a suitably-journalled, vertical, steering shaft 99 carrying inside of a small casing 101 on top of the differential housing 53 a gear 102 in mesh with a gear 103 on the top end of an appropriately-journalled, upright shaft 104 fitted at its lower end with a pinion 105 coacting with the teeth of a horizontal trunnion gear 106 mounted for oscillation on a trunnion-bearing 107 on the under side of the differential gear case and another bearing 108 at the upper side of an opposing plate 109 secured by bolts 110 to the lower part of the differential gear casing as is fully illustrated in Figure 3.

Across its bottom face gear 106 has a groove 111 the opposite end portions of which have parallel side walls accommodating between them two, horizontal slide-bars 112 and 113 arranged edge to edge and bearing on such guiding side walls whereby the two bars are always maintained in parallel relation. Each bar on its under side has a rectangular recess 114 receiving a correspondingly shaped dog 115 equipped with a journal or shaft 116 in a bearing 117 in the plate 109. These two eccentric bearings and dogs are located on a diameter of the gear, such dogs being capable of turning movement but otherwise not displaceable.

The front end of each bar 112 and 113, by means of two universal joints 118 and 119 and an interposed drag-link 121, adjustable as to length, is operatively connected to the end of the forwardly-projecting steering-arm 122 secured to the top end of the corresponding sleeve or hollow shaft 81 and projecting out through the arcuate aperture 64 in the housing 63.

By this comparatively simple means the front wheels are power driven by the electric-motor and they are also capable of turning sidewise by manipulation of the steering-wheel to guide the truck during its travel. The turning steering movements of the two wheels are of a differential nature by reason of the construction employed which is fully set forth in the companion pending application referred to above.

Each longitudinal, tubular member 31 of the main frame near its rear end has a suitably-shaped depending casting 123 fastened thereto, the upper portion 124 of such casting being split and formed to surround the tubular element to which it is clamped, and another somewhat similar depending casting 125 is clamped to the tubular frame member near its extreme rear end.

A horizontal, rectangular, wheel-frame member 126, in which the rear, rubber-tired carrying wheel 127 is mounted on a suitable axis, is hinged at its front end at 129 to the lower portion of each of the front one 123 of the two castings referred to, and at its other end it is formed with spaced guiding ribs 131 straddling and cooperating with an upright guide 132 mounted in convenient manner on the lower portion of casting 125.

A yoke 133, straddling the wheel is hinged to the rectangular wheel-frame at 134 and its upper end has a rod 135 equipped with a spring-seat 136 on which rests a coil-spring 137 bearing at its upper end on an adjustable plate 138 in the top portion of a tubular housing 139 whose lower end is shaped to fit over and which is bolted to the frame member 31, the rod extending through holes provided in such member.

Thus the load on the truck is imposed on the rear-carrying-wheels through such springs as will be readily understood, the frame and wheels being capable of relative movement by reason of the hinged mounting of the latter on the former.

Each side of the machine, adjacent to its rear carrying-wheel 127, has a load lifting and carrying hook 141 of angle cross-section and flared outwardly at its opposite ends, as indicated in Figure 2.

Two upright angle-bars 142 and 143 are riveted at their lower ends to the vertical flange of the horizontal hook member 141 and are braced by inclined bars 144 and 145 fastened to the hook element and to the upper ends of such vertical bars.

The latter have castings 146 and 147 riveted thereto and hinged at 148 and 149 to suitable members 151 and 152 mounted on the front and rear ends of a horizontal connecting bar 153 the latter serving also as a guide bearing on the inner faces of the two elements 123 and 125. Bar 153 is prevented from moving inwardly away from members 123 and 125 by reason of a pair of blocks 150, 150 secured to the elements 151 and 152 and overlapping the outer faces of flanges on the parts 123 and 125 as shown in Figures 1 and 8.

The two elements 142 and 143 are prevented from shifting lengthwise the truck, although capable of swinging laterally of the truck, by reason of their outstanding flanges engaging the parts 123o and 125o of the two castings 123 and 125, as shown in Figure 1.

Casting 152 and another member 154 secured to the connecting bar 153 are connected by slightly curved links 155 and 156, respectively, with ears 157 and 158 on arms 159 and 161 hinged or fulcrumed at 162 and 163 on elements 125 and 124, the free or upper ends of such arms being pivotally connected at 164 and 165 to a rod or link 166 operatively associated with a worm-wheel 167 by a connecting rod or pitman 168 hinged or pivoted at its opposite ends at 169 and 171 to the members 166 and 167.

Gear 167 is mounted on a cross-shaft 172 revoluble in bearings 173 and 174 forming parts of castings 33, 33, the end of the shaft at the opposite side of the machine having a crank-arm 175 and connecting pin 180 in angular alignment or register with the gear pin 171 and connected through like mechanism to raise and lower the load supporting hook on that side of the machine.

Worm-wheel 167 is actuated by a worm 180

176 on a jack-shaft 177 connected to the lifting electric-motor 178 mounted on one of the side frame members, by an intermeshing pinion and gear 179 and 181, respectively.

The truck is equipped with a storage-battery in a suitable housing above the main electric-motor 45, with proper electric conductive connections with the two motors, with an appropriate circuit controller mounted adjacent to and beneath the steering-wheel, with a convenient foot-actuated brake, and with a seat and foot board for the operator, none of which have been illustrated as they really form no part of the present invention although used on the actual machine.

From an understanding of this structure, it will be seen that the tubular longitudinal members of the frame possess great strength, not only transversely, but also torsionally, for the amount of metal embodied in them, that the main or principal cross-member of the frame, the channel beam 32, securely riveted to the frame castings which in turn are fixedly keyed and clamped to the lengthwise tubular frame members, has sufficient torsional flexibility to permit the longitudinal frame elements 31, 31 to assume different horizontal planes at the same time precluding undue or excessive strains in the front cross member 35 which is pivotally connected at its opposite ends to the elements 31. Such hinge or pivotal connections of the front transverse bar are an important improvement in automobile or truck frame constructions, particularly in appliances of this type and style, because they allow free movement of the frame connection, thereby giving flexibility over uneven road surfaces, at the same time eliminating or avoiding stresses in the material likely to result eventually in crystallization.

The frame and its load are carried on the four coil-springs 96 and 137 interposed between the frame and the several load-supporting carrying wheels, and the vertical load thrust of the forward part of the machine is carried on the ball-bearings 68 and 69 which perform the double function of thrust bearings and radial bearings for the driving shafts 67.

The forward wheels, arranged as drive wheels in connection with the improved steering gear, permit an extremely short turning radius without providing steering means for all four wheels as is usually necessary to secure the sharp turn. The new construction has the added advantage of permitting greater load space in width adjacent to the rear wheels, at the same time maintaining the space occupied by such wheels in as small a compass as possible.

In order that the pair of flared lifting hooks may be automatically pressed inwardly closely against the opposite edges of the loaded platform, slightly elevated above the floor or ground, when the truck is not exactly centrally driven over or backed up to the platform and its load, the hooks thus conforming to the position of the load, and to assure that as soon as the platform and its load have been raised from the ground or floor they will be automatically swung to a central position with respect to the truck, each side of the machine is provided with slightly-bent leaf-spring 183 mounted on a stud 184 on casting 128 with its lower end bearing against the outer edge of element 142, the inward pressure on the spring on the hinged hook being adjustable by means of a screw 185 threaded through a hole in the casting and bearing at one end against the outer face of the spring.

The novel appliance is operated in substantially the following manner:

The operator accommodated on a suitable seat, not shown, on the top of the casing or housing enclosing the motor 45 and the electric-battery above it, also not illustrated, governs the speed of the vehicle by the electric-controller referred to which regulates the action of the drive-motor 45, and also guides the truck by manipulation of the steering-wheel 98, the steering mechanism being capable of effecting very sharp or short turns of the vehicle.

If the load to be picked up is comparatively long, the operator guides the truck over or astride it, the two sets of carrying-wheels being on opposite sides thereof.

The pair of spring-pressed hooks 141 engage the opposite edges of the platform on which the load is piled and recede more or less against the action of their springs as occasion requires to receive the loaded platform between them.

The truck, load, and its platform having been thus brought into proper position, the operator actuates his controller to energize the lifting motor 178, which by turning shaft 172, worm-wheel 167, and crank-arm 175, causes the simultaneous upward rocking of all four arms 159 and 161 and the lifting of the load by the pair of opposed hooks 141 which project beneath the opposite edges of its platform.

This lifting action continues until the shaft 172 has turned 180 degrees thus bringing the connecting-rods 168 into dead-center position and the connections of the arms 159 and 161 with the links 155 and 156 to a position approaching dead-center, whereby the strain on the teeth of the worm and worm-wheel and the load strains on the connecting-rods 168 are reduced to a minimum.

The load thus elevated is carried or transported by the truck in such suspended relation to the place of deposit, whereupon the lifting motor is again energized, the worm-wheel, worm, and gearing moving in the same direction as during the load elevating action to cause a descent of the hooks and their associated load and platform to deposit the latter on the ground or floor as the case may be, whereupon the truck may move away in a manner well understood.

During such lifting and lowering of the load-sustaining hooks, the bars 153 bear on the sides of and are guided in their movements by the spaced elements 123 and 125, and, of course, the weight of the frame and the load which it carries through the instrumentality of the grappling hooks is imparted to and supported by the several carrying-wheels through the cushion springs 96 and 137.

It will be perceived that it is not necessary to reverse the action of the lifting motor to lower the load, since such motor may be operated in a single direction for lowering and hoisting. One especial advantage of such an arrangement is that it precludes the lifting of the load beyond a predetermined point by a careless operator, which, if it were permitted to occur, might damage the machine particularly when long material is being handled extending through the machine beneath the working parts. Such hoisting motor, however, is provided with a reverse control to permit lowering of the load before it is raised to the limit, since such action in some cases is desirable.

As the truck is driven astraddle the platform and load, its opposed grappling hooks are spaced apart by their inwardly pressing springs an amount somewhat less than the width of the raised platform sustaining the load, thus assuring as the flaring hooks are spread apart by the stationary platform that they will both properly and effectively engage the opposite edge portions of the platform, hence if the truck and load when lifted from the ground are not exactly central with respect to one another, the balanced springs acting on the hooks will shift the load sidewise into such central position.

In case the load to be transported is of greater height than will fit beneath the front portion of the truck, it can be readily accommodated by the divided rear part of the appliance, and under such circumstances, the truck is backed up to straddle the platform and its charge, whereupon they are lifted and conveyed away in the manner already described.

Inasmuch as the rear part of the truck has a clear and unobstructed load receiving space extending upwardly from the ground indefinitely, a comparatively high load may be easily accommodated in this part of the truck.

In this patent application and the accompanying drawings a single preferred embodiment of the invention has been presented in detail, but those skilled in this art will readily understand that the invention is not limited and restricted to the precise and exact details of structure shown and described since they are capable of comparatively radical modification without departure from the heart and essence of the invention and without the sacrifice of any of its substantial benefits and advantages.

I claim:

1. In a motor-truck, the combination of carrying-wheels, a frame mounted thereon, comprising a pair of spaced longitudinal frame members, a transverse beam rigidly fastened to said longitudinal members, a second cross beam, means pivotally connecting said second beam to said longitudinal members, and load lifting and carrying means on said frame.

2. In a motor-truck, the combination of carrying-wheels, a frame mounted thereon, comprising a pair of spaced longitudinal frame members, a transverse beam rigidly fastened to said longitudinal members at a point back of the front ends of the latter, a second cross beam, means pivotally attaching said second beam to said longitudinal members near their front ends, and load lifting and carrying means on said frame.

3. In a motor-truck, the combination of carrying-wheels, a frame mounted thereon, comprising a pair of spaced longitudinal frame members, a transverse beam rigidly fastened to said longitudinal members at a point back of the front ends of the latter but at a substantial distance in advance of their rear ends, thereby providing a clear load-carrying space between the rearwardly extended parts of said longitudinal members, a second cross beam, means pivotally attaching said second beam to said longitudinal members in front of said first beam, and means to lift and carry the load on said frame.

4. In a motor-truck, the combination of carrying-wheels, and a frame mounted thereon, comprising a pair of spaced tubular longitudinal frame members, a pair of castings clamped around and keyed to said members, a transverse beam rigidly fastened to said castings, a second pair of castings clamped around and keyed to said members, a cross beam hinged to said second pair of castings, and means to lift and carry the load on said frame.

5. In a motor-truck, the combination of carrying-wheels, a frame mounted thereon, comprising a pair of spaced tubular longitudinal frame members, a pair of castings clamped around and keyed to said members at a point back of the front ends of the latter but at a substantial distance in advance of their rear ends, thereby providing a clear load-carrying space between the rearwardly extended parts of said longitudinal members, a second pair of castings clamped around and keyed to said longitudinal members near their front ends, a cross beam hinged to said second pair of castings, and means to lift and carry the load on said frame.

6. In a motor-truck, the combination of carrying-wheels, a main frame mounted thereon, comprising a pair of spaced longitudinal frame members, a transverse beam rigidly fastened to said longitudinal members, a second cross beam, and means pivotally attaching said second beam to said longitudinal members, a supplemental frame rigidly connected to said second beam and having a trunnion mounting on said first beam, and load lifting and carrying means on said main frame.

7. In a motor-truck, the combination of carrying-wheels, a main frame mounted thereon comprising a pair of spaced longitudinal frame members, a transverse beam rigidly fastened to said longitudinal members at a point back of the front ends of the latter but at a substantial distance in advance of their rear ends, thereby providing a clear load-carrying space between the rearwardly extended parts of said longitudinal members, a second cross beam, means pivotally attaching said second beam to said longitudinal members in front of said first beam, a supplemental frame rigidly connected to said second beam and having a trunnion mounting on said first beam, and load lifting and carrying means on said main frame.

8. In a motor-truck, the combination of front and rear carrying-wheels, a main frame mounted thereon comprising a pair of spaced longitudinal frame members, a transverse beam rigidly fastened to said longitudinal members, a second cross beam, and means pivotally attaching said second beam to said longitudinal members, a supplemental frame rigidly connected to said second beam and having a trunnion mounting on said first beam, a drive-motor on said supplemental frame, a driving connection between said motor and some of said wheels, and a load lifting and carrying means on said main frame.

9. In a motor-truck, the combination of front and rear carrying-wheels, a main frame mounted thereon comprising a pair of spaced longitudinal frame members, a transverse beam rigidly fastened to said longitudinal members at a point back of the front ends of the latter but at a substantial distance in advance of their rear ends, thereby providing a clear load-carrying space between the rearwardly extended parts of said longitudinal members, a second cross beam, and means pivotally attaching said second beam to said longitudinal members in front of said first beam, means to carry the load on said frame, a supplemental frame rigidly connected to said second beam and having a trunnion mounting on said first beam, means to steer said front wheels, a motor on said supplemental frame, a driving connection between said motor and said front wheels, and load lifting and carrying means on said main frame.

10. In a motor-truck, the combination of a frame having a pair of widely spaced longitudinal frame members, transverse means connecting said longitudinal members together crosswise at the front part only of the frame thereby providing a clear load-carrying space between the rear portions of said members, means to lift and support the load on said frame, front carrying-wheels for said frame, means to drive said front wheels, means to steer said front-wheels, and rear carrying-wheels beneath the rear portions of said longitudinal members.

11. In a motor-truck, the combination of a main-frame comprising a pair of spaced longitudinal frame members, a transverse beam rigidly fastened to said members at a point back of their front ends but at a substantial distance in advance of their rear ends, thereby providing a clear load-carrying space between the rearwardly extended parts of said longitudinal members, a second cross beam, means pivotally attaching said second beam to said longitudinal members in front of said first beam, a supplemental frame rigidly connected to said second beam and having a pivotal mounting on said first beam, a drive-motor on said supplemental frame, front carrying-wheel means, a driving connection between said motor and said means, means to steer said front carrying-wheel means, rear carrying-wheels beneath the rear portions of said longitudinal members, and means on said frame to lift and support the load during its transportation by the truck.

12. In a motor-truck, the combination of a main-frame, a carrying-wheel column, a carrying-wheel associated with said column, links connecting said frame and column, a lever on said frame bearing on said column, a spring interposed between said frame and lever, and load lifting and carrying means on said main frame.

13. In a motor-truck, the combination of a frame, a carrying-wheel column, a carrying-wheel associated with said column, links of substantially equal lengths connecting said frame and column, a lever on said frame bearing on said column, a spring interposed between said frame and lever, and load lifting and carrying means on said frame.

14. In a motor-truck, the combination of a frame composed at least in part of a hollow member, a carrying-wheel column, a carrying-wheel associated with said column, means pivotally connecting said hollow member and column, a lever accommodated in part in said hollow member and bearing on said column, a spring interposed between said frame and lever, and load lifting and carrying means on said frame.

15. In a motor-truck, the combination of a frame composed in part of a hollow member, a carrying-wheel column, a carrying-wheel associated with said column, links connecting said frame and column, a lever accommodated at least in part in and having a fulcrum bearing on the inside of said hollow member and bearing also on said column, a spring interposed between said frame and lever, and load lifting and carrying means on said frame.

16. In a motor-truck, the combination of a frame composed in part of a longitudinal tubular member, a carrying-wheel column provided with an external lug, a carrying-wheel associated with said column, means pivotally connecting said frame and column, a lever accommodated in part in and having a fulcrum bearing on the inside of said tubular member and bearing also on said column lug, a spring bearing against the under side of said tubular frame member, means extending through said lever and spring and bearing against the lower end of the spring and the top side of said lever, and load lifting and carrying means on said frame.

17. In a motor-truck, the combination of a main frame having spaced longitudinal frame elements, depending members secured to each of said elements, a carrying-wheel frame hinged to one of said elements and guided by the other member, a carrying-wheel mounted in said hinged frame, a spring connection between said main and carrying-wheel frames, and load lifting and carrying means on said main frame.

18. In a motor-truck, the combination of a main frame having spaced longitudinal frame elements, two depending members secured to each of said elements, a carrying-wheel frame hinged to one of each pair of said members and guided by the other member, a carrying-wheel mounted in each hinged frame, a spring housing mounted on each of said longitudinal elements, a spring in said housing bearing against its upper end, a yoke straddling each wheel and having a stem equipped with means bearing against the under side of each spring, and load lifting and carrying means on said main frame.

19. In a motor-truck, the combination of a main frame having rearwardly extended spaced longitudinal frame elements, a carrying-wheel for each of said extended parts, a mounting for each of said wheels on its respective frame element, and load grappling means guided in their movements by said mountings, said latter means constituting the sole support for the load.

20. In a motor-truck, the combination of a main frame having rearwardly extended spaced longitudinal frame elements, two depending members secured to each of said elements, a carrying-wheel frame hinged to one of said members of each pair and guided by the companion member, a carrying-wheel mounted in said hinged frame, a spring connection between said main and carrying-wheel frames, and load grappling means adjacent to said wheels.

21. In a motor-truck, the combination of a main frame having rearwardly extended spaced longitudinal frame elements, two depending members secured to each of said elements, a carrying-wheel frame hinged to one of each of said pairs of members and guided by the companion member, a carrying-wheel mounted in each of said hinged frames, a spring connection between said main and carrying-wheel frames, and load grappling means guided by said members in their movements.

22. In a motor-truck, the combination of a main frame, steering and carrying wheels therefor, load grappling means adapted to lift and carry the load, rocker arms on said frame, means connecting said rocker arms and grappling means, an operating shaft on said frame, a crank-arm construction and crank-pin at each end of said shaft, rods connecting said crank-pins and rocker arms, and means to operate said shaft to actuate said load grappling means.

23. In a motor lift truck, the combination of a frame, carrying-wheels therefor, load grappling devices mounted on said frame for movement transversely thereof, spring means tending to press said devices inwardly toward the load, and means to raise and lower said devices.

24. In a motor lift truck, the combination of a frame, carrying-wheels therefor, load grappling devices with outwardly flaring ends hinged on said frame for movement transversely thereof, spring means tending to press said devices inwardly toward the load, and means to raise and lower said devices.

25. In a motor-truck, the combination of a frame comprising a pair of longitudinal frame members, transverse frame elements of substantially inverted U shape connecting said members together at their front portions, such members extending unconnected together rearwardly from said transverse elements to provide a space for carrying an underslung load which may extend beyond either end of the truck and a vertically clear load carrying space between the rearwardly extended parts of said longitudinal members, carrying-wheels for said frame, and means to lift and carry the load suspended on said frame.

26. In a motor-truck, the combination of a frame comprising a pair of longitudinal frame members, transverse frame elements of substantially inverted U shape connecting said members together at their front portions, such members extending unconnected together rearwardly from said transverse elements to provide a space for carrying an underslung load which may extend beyond either end of the truck and a vertically clear load-carrying space between the rearwardly extended parts of said longitudinal members, front carrying-wheels for said frame, rear carrying-wheels for said frame mounted on the rearwardly extended parts of said longitudinal members, and means also mounted on the rearwardly extended parts of said longitudinal members to lift and carry the load suspended on said frame.

27. In a motor lift truck, the combination of a main-frame, carrying-wheels therefor, an elongated load-supporting hook-member, lifting means on said main-frame, means to rockingly support said hook-member near both ends on said lifting means with capacity for swinging transversely of the main-frame to engage and clear the load, and means in part rigid with said main-frame and in part movable with said hook-member to guide the latter in its up and down movements and to prevent substantial longitudinal movement of the hook member relatively to the main frame.

28. In a motor lift truck, the combination of a main-frame, carrying-wheels therefor, an elongated load-supporting hook-member, lifting means on said main-frame, means to rockingly support said hook-member near both ends on said lifting means with capacity for swinging transversely of the main-frame to engage and clear the load, means in part rigid with said main-frame and in part movable with said hook-member to guide the latter in its up and down movements and to prevent substantial longitudinal movement of the hook member relatively to the main-frame, and brace means between said hook member and that part of said guiding means movable with the hook member.

HARRY B. ROSS.

Witness:
BLENDA A. SEALING.